Patented Sept. 5, 1950

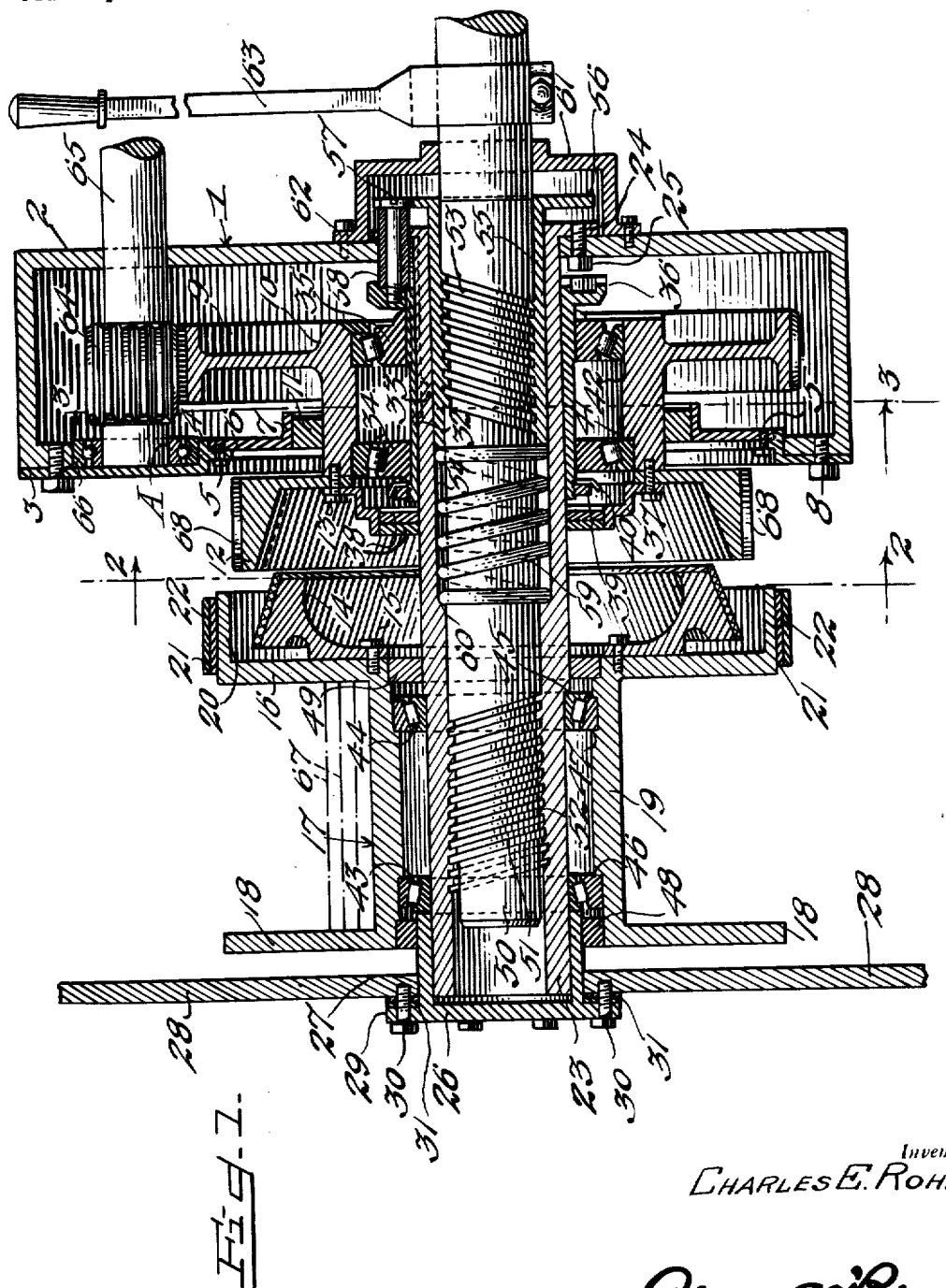

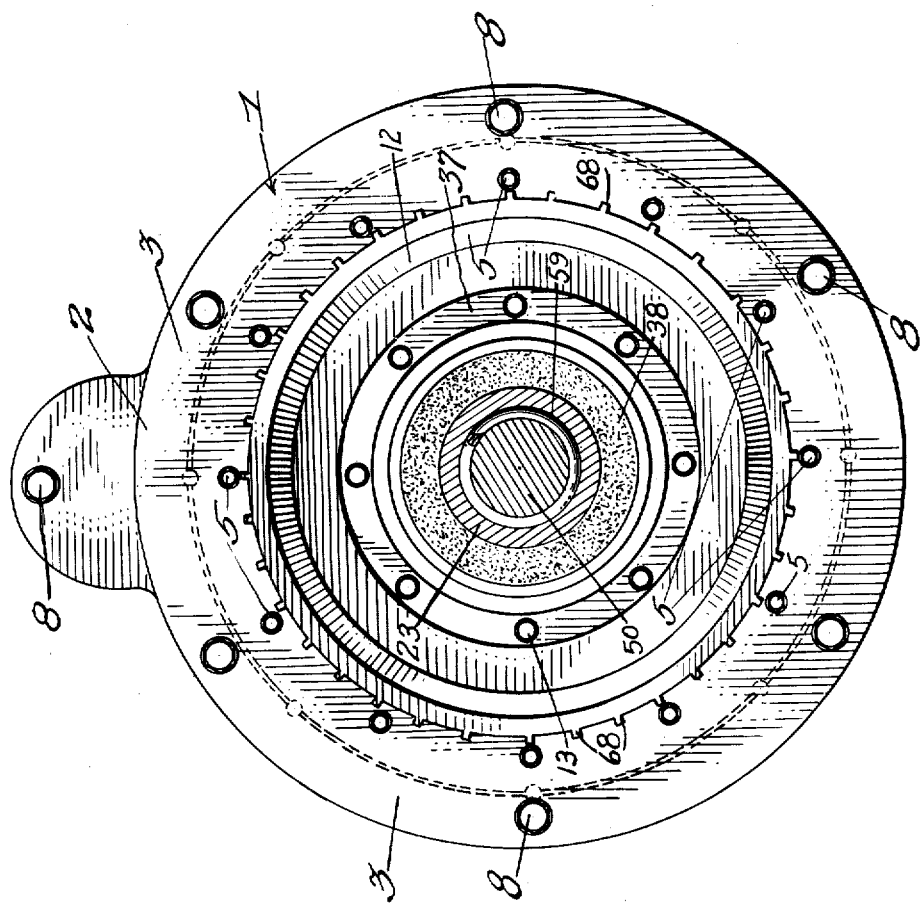

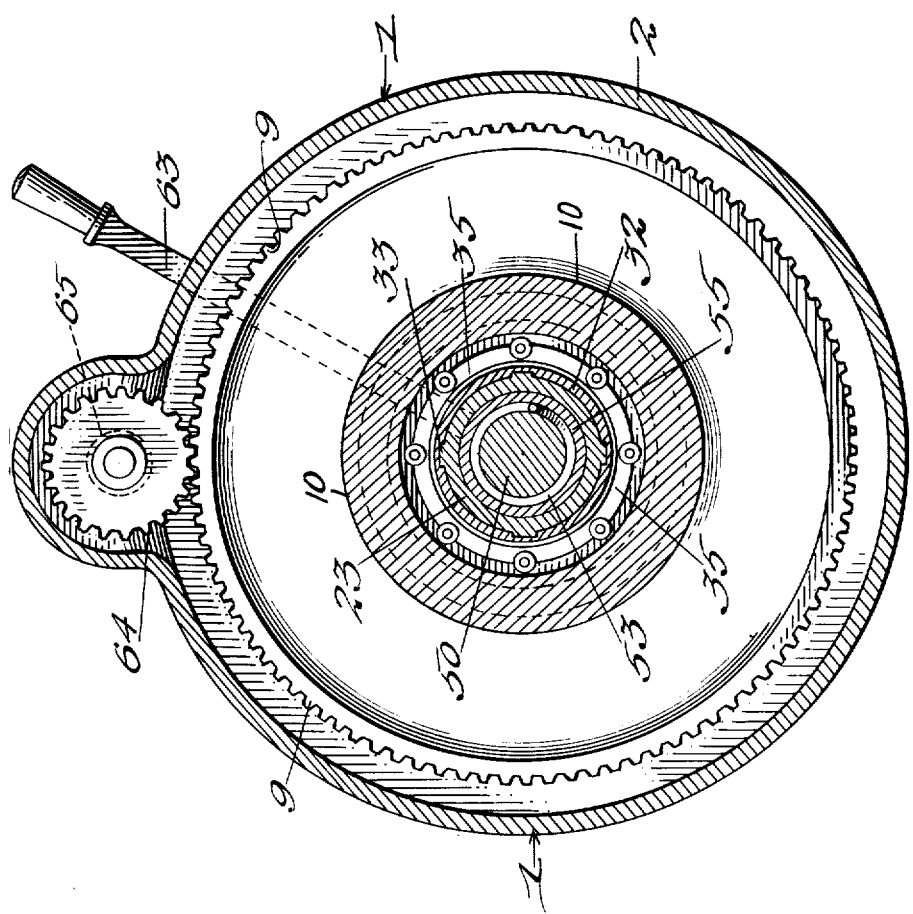

2,521,607

UNITED STATES PATENT OFFICE 2,521,607

SCREW OPERATED CLUTCH

Charles E. Rohn, Stockton, Calif.

Application April 2, 1946, Serial No. 659,071

3 Claims. (Cl. 192—97)

My invention relates to power transmissions of the cable winding and reeling type such as disclosed in my United States Letters Patent No. 2,285,094, dated June 2, 1942, over which the instant invention is designed as an improvement.

The primary object of my instant invention is to provide a power transmission of simple form, and comparatively inexpensive construction, for use on bulldozers, tractors, and the like, to apply power through a friction clutch operated cable winding reel for lifting and lowering operations, for instance, in operating bulldozer blades, loading tractor drawn trailers, and the like, the clutch being adapted for operation by the power take-off of the bulldozer, or tractor, and designed for quicker engagement and disengagement than can be accomplished in other friction clutches, of commerce, so that quicker action is obtained and friction incident to engaging and disengaging the clutch reduced to a minimum.

Another object is to provide for engaging and disengaging a shiftable clutch member, by operation of a clutch control rock shaft endwise movable under rocking thereof, together with means operative by said shaft for increasing the ratio of speed, at which the shiftable clutch member is shifted, relative to the speed of endwise movement of the shaft.

Still another object is to render such transmissions dust, oil and grease tight.

Other and subordinate objects, also comprehended by my invention, together with the precise nature of my improvements, and the manifold advantages thereof, will be readily understood when the succeeding description and claims are read with reference to the drawings accompanying and forming part of this specification.

In said drawings:

Figure 1 is a view in longitudinal section of my improved power transmission, in a preferred embodiment thereof, with the clutch disengaged, Figure 2 is a view in transverse vertical section taken on the line 2—2 of Figure 1, and Figure 3 is a similar view taken on the line 3—3 of Figure 1.

Referring to the drawings by numerals, my improved power transmission, as shown, comprises a gear casing I of cylindrical form, in greater part, and having a substantially annular, dished, section 2 forming the outer side thereof together with the circumferential portion of the casing, a substantially annular plate section 3 forming, in part, the inner side of said casing I and provided with an internal, inner edge, circumferential flange 4 of T-form in cross- section fitted over and bolted, as at 5, to the outer edge of a smaller, annular, plate section 6 having an internal, inner edge, circumferential flange 7, for a purpose presently seen, said plate section 6 completing said casing I on the inner side thereof. The dished section 2 is bolted to the plate section 3, as at 8.

Within the gear casing I is a driven gear 9 concentric to the axis of said casing and provided with a tubular hub 10 extending out of the plate section 6 with a working fit in a sealing ring 11 suitably fixed in the flange 7 of said plate section. The hub 10 is laterally shiftable, slidably, as well as rotatable in said sealing ring 11.

An internally tapered, female, clutch member 12 of annular form is bolted, as at 13, to the hub 10 externally of the casing I contiguous the inner side thereof for driving by said hub under rotation of the gear 9 and to be shifted by said hub 10 and gear 9 laterally toward and from a driven, relatively fixed, male clutch member 14 of frustro-conical annular form.

The male clutch member 14 is bolted, as at 15, concentrically to one side flange 16 of a cable winding reel 17 having an opposite side flange 18 and a cylindrical hub 19. The side flange 16 is of dished form to provide a brake drum 20 having a lining 21 thereon for co-action with a brake band 22. The brake drum 20 partly houses the male clutch member 14 and also the female clutch member 12 when the same is engaged with said male clutch member.

The described driven gear 9 and the reel 17 are mounted, by means presently described, upon an axial, tubular housing 23 extending through the casing I in the axis thereof, and similarly through the reel 17, with an outer end flange 24 bolted, as at 25, to the gear casing section 2. The opposite, inner end, of said housing 23 is fitted in a cylindrical supporting cap 26 fitted in and extending through an opening 27 in a frame plate 28. The cap 26 is provided with a circumferential end flange 29 by means of which, and bolts 30, said cap is fixed to said frame plate 28 with suitable shims 31 interposed between the flange 29 and said plate 28. The frame plate 28, as well as the casing I, are designed to be suitably fixed to a bulldozer, or tractor, not shown. As will be seen, the housing 23 is thus fixedly mounted.

Means are provided for mounting the driven gear 9 and the hub 10 of said gear on the housing 23 for rotation and lateral shifting movement, said means comprising an external gear shifting sleeve 32 on said housing 23 slidably fitted on the same and splined thereon, as at 33, said sleeve extending through the gear casing 1 and the hub 10 of said gear 9. A pair of oppositely inclined roller bearing assemblies 34, 35 in said hub 10, at opposite ends thereof, mount said hub and the gear 9 on said gear shifting sleeve 32 for shifting laterally by said sleeve. A circumferential flange 36 is provided on the outer end of the gear shifting sleeve 32, the purpose of which will presently appear. An annular keeper 37 of right angled stepped form in cross-section is secured to the female clutch member 12, within the same, concentrically thereof, by the bolts 13, and in which are suitably fixed sealing rings 38 surrounding the housing 23. A nut 39 is threaded onto the inner end of the gear shifting sleeve 32 with a nut locking member 40 on said end and which provides for tightening the bearing assemblies 34, 35 against internal shoulders 41, 42 provided in the hub 10.

For mounting the reel 17 on the housing 23, and hence the male clutch member 14, a pair of oppositely inclined roller bearing assemblies 43, 44 are suitably fixed in opposite ends of the hub 19, and on said housing, whereby said reel is rotatable on said housing between the female clutch member 12 and the frame plate 28. The pair of bearing assemblies 43, 44 are confined between the cap 26 and an external shoulder 45 on the housing 23, and also against the internal shoulders 46, 47 in the hub 19. Sealing rings 48, 49 are fitted in and suitably fixed in the ends of the hub 19. By using different shims 31 the cap 26 may be adjusted to adjust the roller bearing assemblies 43, 44 to take up wear.

A clutch shifting shaft 50 extends into the housing 23, from the outer end thereof, with an inner end portion provided with right-hand threads 51 adapted to turn in similar, internal threads 52 provided in the housing 23 within the confines of the hub 19 of the reel 17. The clutch shifting shaft 50 is provided with an intermediate, left-hand threaded, portion 53 within the confines of the gear casing 1 and within an enlarged bore portion 54 of said housing 23.

A tubular, internally threaded, nut 55 is slidably fitted in the enlarged bore portion 54 of the housing 23 and on said left-hand threaded portion 53 of the clutch shifting shaft 50 to be fed endwise by said threaded portion 53. The nut 55 is operatively connected to the gear shifting sleeve 32 as follows. Said nut 55 extends out of the casing section 1 at the outer side of said casing and is provided with an outer end, circumferential, flange 56. Headed studs 57 extending through said flange 56 are threaded into the flange 36 of the gear shifting sleeve 32. The studs 57 extend through spacer bushings, as at 58, slidably extended through the section 2 of the gear casing 1.

A coil spring 59 on the clutch control shaft 50 and interposed between an internal shoulder 60 in the housing 23, and the inner end of the tubular nut 55, tends to move said nut in a manner to facilitate disengaging the female clutch member 12 from the male clutch member 14, as will presently be seen.

A cap 61 surrounding the clutch control shaft 50 and bolted to the section 2 of the gear casing 1, as at 62, serves to form a seal around the outer ends of the gear shifting sleeve 32, the housing 23, and the nut 55. The clutch shifting shaft 23 extends out of said cap 61 and is provided at its outer end with a hand lever 63 fixed thereon for rocking said shaft.

A relatively smaller driving gear 64 for the driven gear 9 is suitably fixed on a drive shaft 65 extending into the gear casing 1, crosswise thereof, with an inner end provided with a ball bearing assembly 66 suitably mounted on the plate section 3 of said casing 1. The drive shaft 65 is designed for connection in any suitable manner to the power take-off of the bulldozer, or tractor, not shown.

As shown in dotted lines in Figure 1, the reel 17 may be provided with suitable annular shim members 67 for building up the diameter of the reel to provide for faster reeling up of a cable, not shown, with which the reel 17 is designed to be provided, in the usual manner.

The female clutch member 12 may be provided with external fins 68 for cooling the male clutch member 14 and the brake drum 20.

Referring now to the operation of the described invention, with the parts as shown in Figure 1, the female clutch member 12 is disengaged from the male clutch member 14 and the reel 17 may idle on the housing 23 for unwinding of a cable, not shown, connected thereto. The drive shaft 65 operating, the driven gear 9 together with the female clutch member 12 are free to idle as will be clear. When it is desired to engage the female clutch member 12 with the male clutch member 14 to operate the reel 17 in a direction to wind up a cable, the clutch control shaft 50 is rocked clockwise, as viewed in Figure 1. Such rocking of the clutch control shaft 50, through the right-hand threads 51, 52 causes said shaft to move endwise inwardly of the housing 23 and by such movement the nut 55 is caused to slide endwise inwardly of the housing 23. Such rocking of the clutch control shaft 50, through the left-hand threaded portion 53 causes the nut 55 to be fed inwardly of the housing 23 and relative to the clutch control shaft. Thus, the nut 55 is moved further than said clutch control shaft 50 and faster than said shaft, by virtue of the fact that the left-hand threaded portion 53 feeds the nut 55 inwardly of the housing 23 and relative to the clutch control shaft 50, while at the same time the inward movement of said shaft serves to carry said nut inwardly of said sleeve. The described movement and/or feeding of the nut 55, through the studs 57 and the flange 56 on the gear shifting sleeve 32 imparts similar movement to said sleeve which is transmitted to the gear 9 through the bearing assemblies 34, 35 so that the female clutch member 12 is moved toward the male clutch member 14 to frictionally engage the same. During this lateral movement of the gear 9, said gear slides in mesh with the driving gear 64. The described movement, and/or feeding of the nut 55 is opposed by the coil spring 59 which tends to prevent the female clutch member 12 and the male clutch member 14 from freezing, one to the other. Rocking movement of the clutch control shaft 50 counterclockwise will effect disengagement of the female clutch member 12 from the male clutch member 14 in a manner which will be readily understood since the operation of the parts is merely reversed in disengaging said members.

The gear casing 1 is designed to contain oil and the hubs 10 and 19 to contain grease for lubricating purposes. The housing 23 may be similarly provided with lubrication for the clutch control shaft 50.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a power transmission of the class described, a driven gear shiftable laterally while being driven and having fast on one side thereof a concentric female clutch member laterally shiftable therewith, a cable winding reel rotatable about the axis of said gear and having a concentric male clutch member fast thereon with which said female clutch member is adapted to be engaged by lateral shifting thereof, and means to shift said gear comprising a clutch control rock shaft, means to cause said shaft to move endwise upon rocking thereof, gear shifting connections between said shaft and gear operative by rocking of said shaft for shifting the gear faster and further than said shaft is moved endwise, and manipulative means for rocking said shaft, the second mentioned means comprising a fixed tubular housing in which said shaft is threaded.

2. In a power transmission of the class described, a driven gear shiftable laterally while being driven and having fast on one side thereof a concentric female clutch member laterally shiftable therewith, a cable winding reel rotatable about the axis of said gear and having a concentric male clutch member fast thereon with which said female clutch member is adapted to be engaged by lateral shifting thereof, and means to shift said gear comprising a clutch control rock shaft, means to cause said shaft to move endwise upon rocking thereof, gear shifting connections between said shaft and gear operative by rocking of said shaft for shifting the gear faster and further than said shaft is moved endwise, and manipulative means for rocking said shaft, the second mentioned means comprising a fixed tubular housing in which said shaft is threaded, said gear shifting connections comprising a tubular nut threaded onto said shaft for feeding endwise relative to the same, the threads last mentioned being oppositely pitched relative to the threads first mentioned.

3. In a power transmission of the class described, a tubular fixed housing, a driven gear surrounding the housing and shiftable laterally longitudinally thereof, an annular clutch member fast on said gear for lateral shifting therewith and drive thereby, a cable winding reel rotatably mounted on said housing, a clutch member on said reel for engagement by the laterally shiftable clutch member to be driven thereby, and means for shifting said gear comprising a rock shaft extending out of said housing and endwise movable relative thereto, an endwise movable sleeve splined on said housing and on which said gear is rotatably mounted, a tubular endwise slidable nut in said housing surrounding said shaft with one end extending out of one end of the housing, operating connections between said end of the nut and one end of the sleeve, whereby sliding of the nut correspondingly slides the sleeve, oppositely pitched screw threads connecting the shaft to the housing and nut, respectively, whereby rocking of said shaft imparts endwise movement thereto and endwise movement to the nut and sleeve to shift said gear further and faster than said shaft is moved endwise, and means for rocking said shaft.

CHARLES E. ROHN.

REFERENCES CITED

The following references are of record in the file of this patent:

UNITED STATES PATENTS

| Number | Name | Date |
|---|---|---|
| 160,570 | Carner | Mar. 9, 1875 |
| 1,430,627 | Cleland | Oct. 3, 1922 |
| 1,912,645 | Le Tourneau | June 6, 1933 |
| 2,175,383 | Eason | Oct. 10, 1939 |
| 2,286,547 | Hutchins | June 16, 1942 |